United States Patent [19]

Niva

[11] 4,030,232
[45] June 21, 1977

[54] COLLAPSIBLE CRUSTACEAN TRAP

[76] Inventor: Russell N. Niva, P.O. Box 521, Melbourne, Fla. 32901

[22] Filed: Oct. 14, 1975

[21] Appl. No.: 622,224

[52] U.S. Cl. .............................................. 43/105
[51] Int. Cl.² ..................................... A01K 69/10
[58] Field of Search ............................ 43/105, 100

[56] References Cited

UNITED STATES PATENTS

| | | | |
|---|---|---|---|
| 1,887,059 | 11/1932 | Kraus et al. | 43/105 |
| 2,731,761 | 1/1956 | Marshall | 43/100 |
| 2,760,297 | 8/1956 | Buyken | 43/105 |
| 2,769,274 | 11/1956 | Ougland | 43/105 |
| 3,795,073 | 3/1974 | Olsen | 43/105 |

Primary Examiner—Louis G. Mancene
Assistant Examiner—Daniel J. Leach
Attorney, Agent, or Firm—Duckworth, Hobby, Orman, Allen & Pettis

[57] ABSTRACT

An apparatus having a plurality of movably attached panels which define an enclosed cavity therein for catching and restraining crustaceans. One of the panels has an aperture therethrough for allowing the entry of the crustaceans into the cavity. The cavity also contains a device for storing bait and a device for restraining the crustaceans within the cavity after they have eaten the bait and buoyantly floated to the upper portion of the cavity. The plurality of panels and the restraining device are attached by a plurality of hinges for allowing the panels and the restraining device to fold into the cavity, thereby collapsing the trap and allowing for more compact storage.

19 Claims, 4 Drawing Figures

COLLAPSIBLE CRUSTACEAN TRAP

BACKGROUND OF THE INVENTION

This invention relates to an apparatus for trapping submarine animals, and in particular relates to an apparatus for trapping submarine crustaceans in their natural environment.

Crustacean traps are well known to the experienced fisherman. The normal device for trapping crustaceans comprises a housing having an enclosed cavity therein and an aperture communicating through the housing and into the cavity for allowing the entry of the crustaceans. The normal traps have a device within the cavity which holds bait such as fish parts or meat, and also a labyrinth or barrier having an aperture therethrough which traps the crustaceans within the cavity either during their search for the bait or after they have consumed the bait. The most common type of crustacean trap allows the lobster, crab or other crustacean to enter the cavity by means of an externally opening aperture through the housing. The crustacean is routed to the bait by tunnels which communicate with the externally opening apertures. After the crustacean consumes the bait, it buoyantly floats toward the top of the cavity, through an internal aperture and into a second portion of the internal cavity. This internal aperture is specially designed to act as a one-way gate where the crustaceans may easily pass upwardly therethrough but which inhibits the passage of the crustacean in the downward or outward direction. Therefore, the crustaceans are trapped in the upward portion of the cavity. The trap may be removed from the water and the crustaceans therein may be removed by way of a door communicating into the upper portion of the cavity.

While these traps are quite common, their disadvantages are also well known. Generally these traps are quite heavy and bulky because they are permanently formed of steel or aluminum mesh. Since the traps are preformed into a cubicle shape it is very difficult to store a large number of these traps on the decks of a ship. It is often necessary to remove a large number of these traps from one fishing area and transport them to a new, more promising fishing area. This requires the storage of a large number of the traps upon the deck of a ship. Due to the large size and weight of the normal traps only a limited number can be transported in this manner. This forces the ship to make several unnecessary trips.

This invention concerns a crustacean trap having a plurality of wire or extruded polyethylene plastic mesh panels interconnected by a plurality of hinges adapted to allow the panels to fold within the internal cavity and thereby collapse the otherwise bulky crustacean trap. In this manner, a large number of traps may be collapsed and stored upon the deck of a ship. This increase in transportation efficiency will allow the fisherman to move more quickly to better fishing grounds and thereby increase the probability of catching more crustaceans.

SUMMARY OF THE INVENTION

The present invention contemplates a folding trap for catching crustaceans. The collapsible trap is formed from a plurality of movably attached panels, with the panels defining an enclosed cavity therein. A first aperture in one of the panels allows the entry of the crustaceans into the cavity. A device is included on the floor of the internal cavity for the open storage of bait. A restraining device is included in the upper portion of the cavity for restraining the crustaceans therein after they have consumed the bait and floated through an internal aperture into another portion of the internal cavity. The wire mesh panels are movably attached to each other and to the internal restraining device by a plurality of hinges. The hinges are adapted to allow the panels and the restraining device to sequentially fold into the volume previously defining the internal cavity, thereby collapsing the crustacean trap and allowing for more compact storage thereof.

THE DRAWINGS

DETAILED DESCRIPTION

A first embodiment of a collapsible crustacean trap in accordance with the present invention will now be described with reference to FIGS. 1, 2, 3 and 4.

Figure 1:
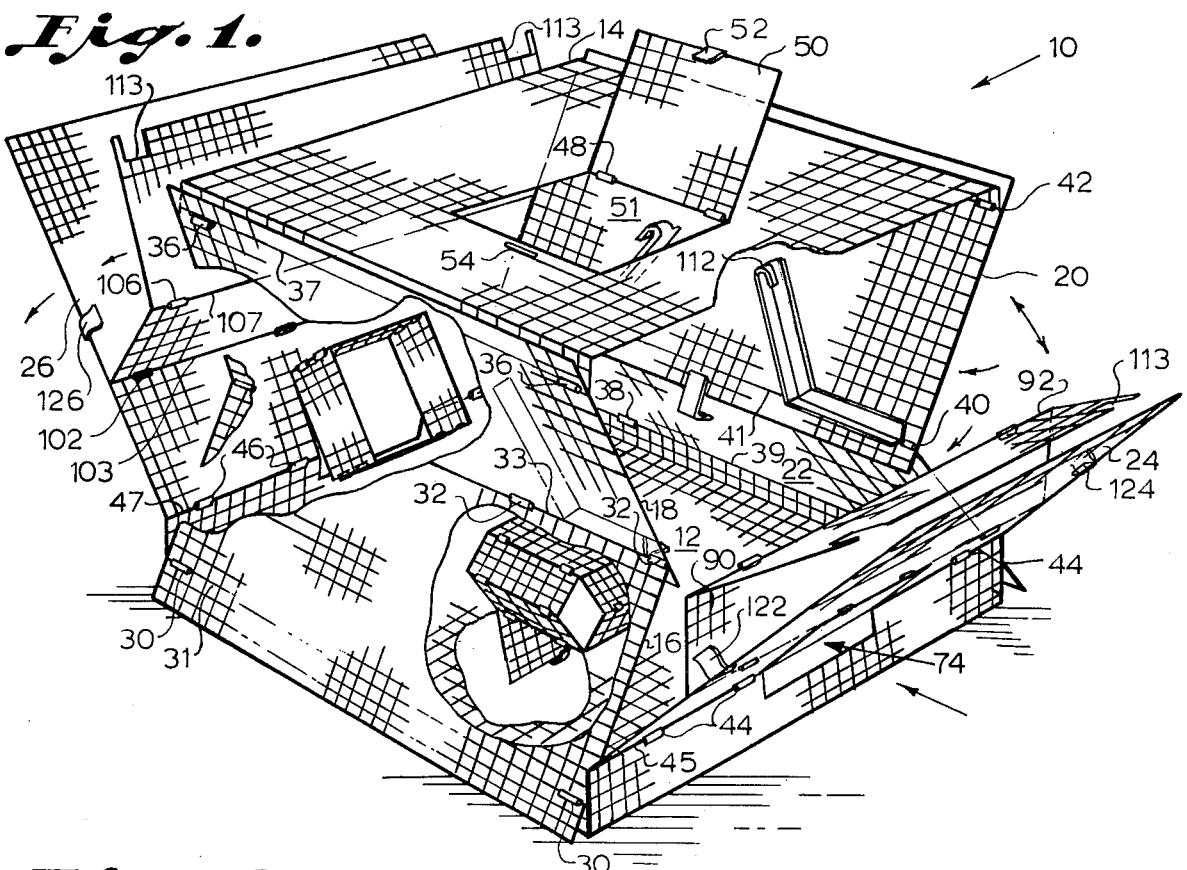
FIG. 1 is a perspective view of a foldable trap for catching and restraining crustaceans therein. The folding panels and doors are shown in the partially open position.
Figure 2:
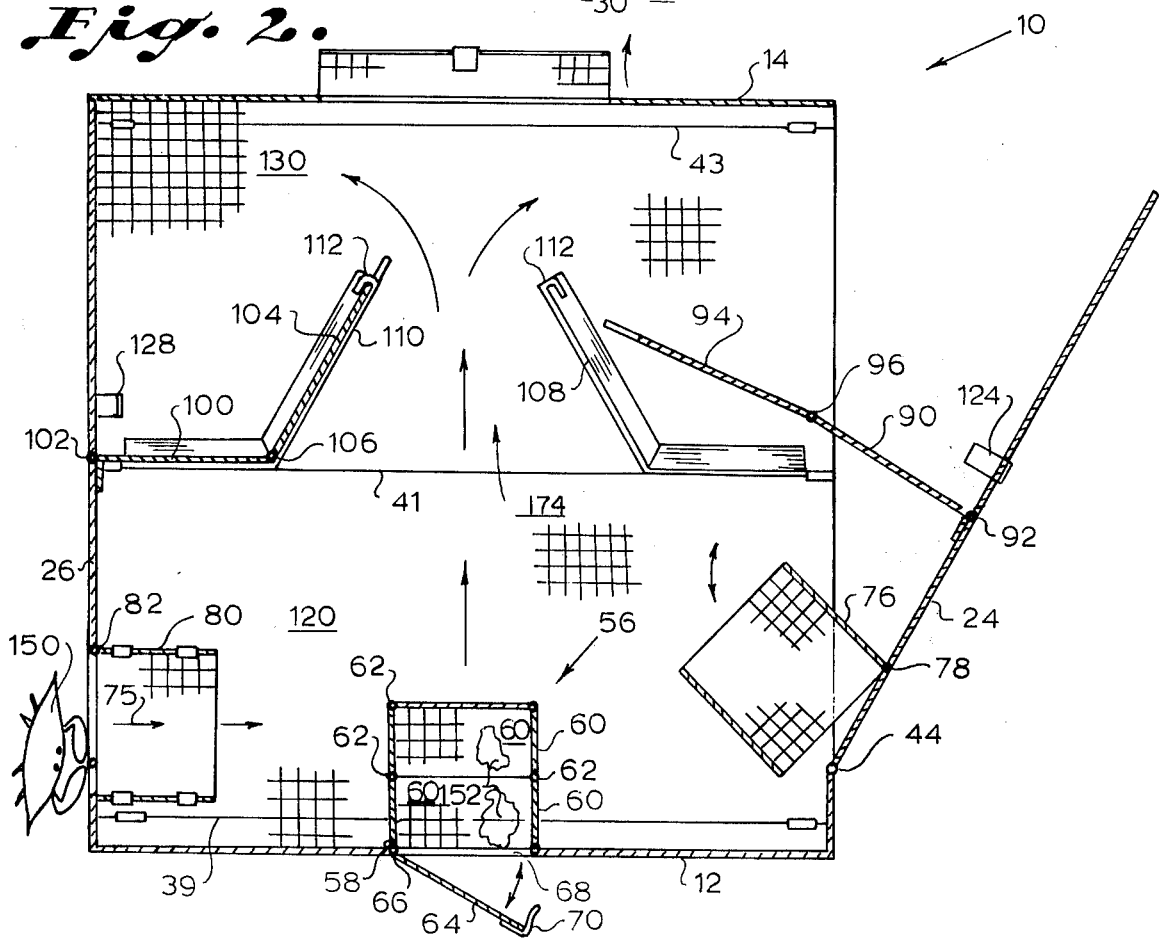
FIG. 2 is a frontal cross-section view of the folding crustacean trap with the panel on one side being partially detached.

A collapsible trap for catching crustaceans, generally referred to as 10 in FIGS. 1 and 2, includes a generally square base panel 12 and top panel 14. A generally rectangular lower front panel 16 is movably attached to the base panel 12 by a plurality of hinges 30 along a folding line 31. In turn, the lower front panel 16 is movably attached to an upper front panel 18 by a plurality of hinges 32 along a folding line 33. The upper front panel 18 is movably attached to the top panel 14 by a plurality of hinges 36 along a folding line 37. In a similar manner, a lower rear panel 22 is movably attached to the base panel 12 by a plurality of hinges 38 along a folding line 39. An upper rear panel 20 is movably attached to the lower rear panel 22 by a plurality of hinges 40 along a folding line 41. The upper rear panel 20 is movably attached to the top panel 14 by a plurality of hinges 42 along a folding line 43. The folding lines 31, 33, 37, 39, 41 and 43 are recessed from the margins of their respective panels 16, 18, 22 and 20 to provide an overlap with their respective adjacent coupling plates. This coupling of abutting surfaces provides extra rigidity to the collapsible trap.

A right side panel 24 is movably attached to the base panel 12 by a plurality of hinges 44 about a folding line 45. Similarly, a left side panel 26 is movably attached to the base panel 12 by a plurality of hinges 46 about a folding line 47. Latches 122 and 124 are attached to the right side panel 24 for coupling respectively to the overlapping areas of the front panels 16 and 18 and the rear panels 20 and 22. Similarly, latches 126 and 128 are attached to the left side panel 26 for coupling respectively to the overlapping areas of the front panels 16 and 18 and the rear panels 20 and 22. The folding lines 45 and 47 of the side panels 24 and 26 are slightly elevated from the lower front panel 16 folding line 31, and the lower rear panel 22 folding line 39.

A generally rectangular wire, or plastic, mesh door 50 is attached to the top panel 14 by movable hinges 48. The door 50 congruently couples within the generally rectangular aperture 51 in the center of the top panel 14. A latch 52 is attached to the distended end of the door 50 and slidingly communicates with a latch attaching piece 54 attached to the top panel 14.

Figure 3:
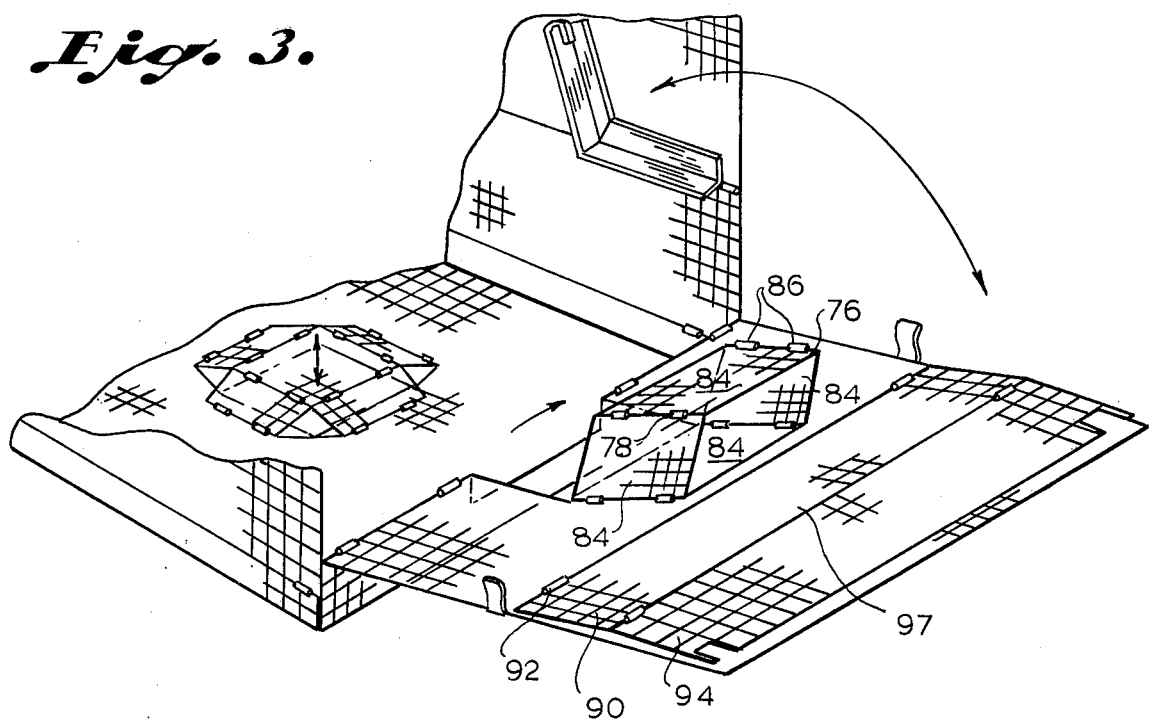
FIG. 3 is a perspective view of the partially open side panel as shown in FIG. 2.

With continuing reference to FIGS. 1 and 2, a foldable bait container, generally denoted by 56, is movably attached near the center of the base panel 12 by a plurality of hinges 58. The generally rectangular foldable bait container 56 is formed by a plurality of panels 60 interconnected by a plurality of hinges 62. The panels 60 and hinges 62 are adapted to allow the bait trap 56 to fold substantially flat onto the base panel 12 when in the stored position as shown in FIG. 3. A generally rectangular bait door 64 is coupled by a plurality of hinges 66 to the base panel 12. The movable door 64 congruently couples within a rectangular aperture 68 within the base panel 12. The door 64 is secured therein by a latch mechanism 70 which attaches to the base panel 12.

Figure 4:
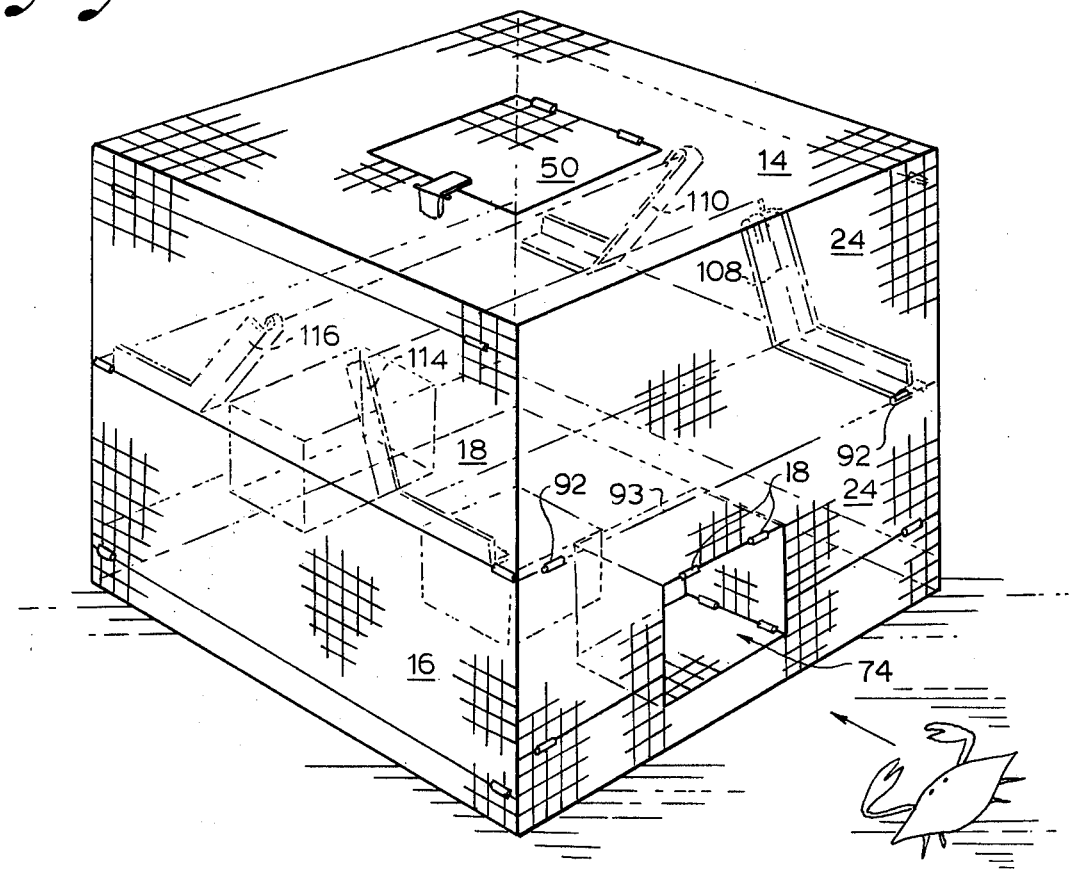
FIG. 4 is a perspective view of the folding crustacean trap having all panels and doors secured in the normal operating position.

With specific reference to FIGS. 2 and 4, a generally rectangular aperture 74 is located in the right side panel 24 adjacent to the base panel 12. A foldable, generally rectangular tunnel 76 is attached to the inside surface of the right side panel 24 by a plurality of hinges 78. A similar foldable, generally rectangular tunnel 80 is movably attached to the inside surface of the left side panel 26 adjacent to an aperture 75, by a plurality of hinges 82. As shown in FIG. 3, the foldable tunnel 76 (and similarly tunnel 80) comprises four generally rectangular wire, or plastic, mesh panels 84 movably attached along only one edge thereof by a plurality of hinges 86 to allow the panels 84 to fold in a flat position onto the interior surface of the side panels 24 (or 26).

With reference to FIGS. 1 and 2, a generally rectangular restraining partition 90 is movably attached to the right side panel 24 by a plurality of hinges 92 along folding line 93. A generally rectangular ridge partition 94 is movably attached to the distended end of the restraining partition 90 by a plurality of hinges 96 defining folding line 97. The restraining partition 90, the ridge partition 94 and the plurality of hinges 92 and 96 are adapted to allow the two plates to fold flat along the inside surface of right side panel 24 when in the stored position (note FIG. 3). Likewise, a restraining partition 100 is movably attached to left side panel 26 by a plurality of hinges 102 defining a folding line 103. A ridge partition 104 is movably attached at the distended end of restraining partition 100 by a plurality of hinges 106 defining a folding line 107.

With specific reference to FIGS. 2 and 4, a first L-shaped guide member 108 is attached to the inside surface of upper rear panel 20. The ridge end of the L-shaped guide member 108 is bent upward at an acute angle to guide and couple with the ridge partition 94 and the restraining partition 90. A hook 112 is attached at the ridge end of the L-shaped guide member 108 to couple with the detent 113 located at the margin of the ridge partition 94. A similar L-shaped guide member 114 is mounted on the inside surface of the upper front panel 18. In a similar manner, restraining partition 100 and ridge partition 104 are guided into position by an L-shaped guide member 110 attached to the inner surface of the upper back panel 20 and an L-shaped guide member 116 attached to the inner surface of upper front panel 18.

The opposing restraining partitions 90 and 100 and the opposing ridges partitions 94 and 104 define a trianguloid shaped passageway 174 communicating between a lower internal cavity 120 and an upper internal cavity 130. The two ridge partitions 94 and 104 are angled inward such that they focus any buoyantly supported and upwardly floating body through the trianguloid channel 124 and into the upper internal cavity 130.

The operation of the collapsible crustacean trap will be illustrated by reference to FIG. 2. A crustacean 150 is attracted by bait 152, stored within the foldable bait trap 56, to move through the aperture 75 (or 74 on the opposite side) and tunnel 80 and into the lower internal cavity 120. The crustacean 150 then consumes a portion of the bait 152 causing the crustacean 150 to be buoyantly lifted from the lower internal cavity 120 through the trianguloid channel 174 and into the upper internal cavity 130. The crustacean 150 is restrained within the upper internal cavity 130 by the operation of the ridge partitions 94 and 104. The trapped crustacean may be removed through the aperture 51 by opening the door 50 in the top panel 14. Additional bait may be inserted into the foldable bait container 56 by opening the door 64 and inserting the bait through the aperture 68.

The foldable crustacean trap may be collapsed by the following procedural steps. Snaps 122 and 124 are loosened to allow the right side panel 24 to fold outwardly about the folding line 45 defined by the multiple hinges 44. Similarly, the snaps 126 and 128 are loosened to allow the left side panel 26 to fold outwardly about the folding line 47 defined by the plurality of hinges 46. The generally rectangular tunnels 76 and 80 as well as the bait trap 56 are folded into the flat storing position adjacent to their respective side panels 24 and 26. A downward pressure then is exerted on the top panel 14 causing the front top and front bottom panels 16 and 18 to fold inwardly along the folding line 33 while folding line 37 approaches folding line 31. Similarly, the rear upper and lower panels 20 and 22 are caused to fold inwardly about the folding line 41 while folding line 43 approaches folding line 39. Therefore, the hinges 40 and 32 move inwardly, within the cavities 130 and 120, thereby collapsing the foldable crustacean trap 10. The front and rear lower panels 16 and 22 fold to a position flat against the base panel 12. Front and rear upper panels 18 and 20 then fold flat against their corresponding lower panels 16 and 22. The top panel 14 then folds flat onto the front and rear upper panels 18 and 20. Next, the right side panel 24 is folded about folding line 45 onto the top panel 14 in a flat position. Next, the left side panel 26 is folded about the folding line 47 onto the right side panel 24 in a flat position. In this manner the foldable crustacean trap may be collapsed into a rectanguloid which occupies only a small fraction of the volume previously occupied by the operational crustacean trap. Of course, the trap may be reassembled by following the above-described steps in the reverse order. Note that the ridge partitions 94 and 104 must be inserted into guiding members 108 and 110 before sides 24 and 26 are snapped into place. In this manner hooks 112 will engage detent 113 and force hinges 96 and 106 and partitions 90, 94, 100 and 104 down into their respective guide members 108, 110, 114 and 116. The preferred embodiment of the present invention is constructed of heavy galvanized steel or aluminum wire, or polyethylene plastic mesh. The connecting hinges are corrosion resistant. Miscellaneous brackets are aluminum, galvanized steel or plastic. Other corrosion resistant material may be substituted.

It will be clear at this point that a foldable crustacean trap has been provided which overcomes some of the prior problems of fixed crustacean traps, while improving the overall performance of the trap design. However, the invention is not to be construed as limited to the particular forms disclosed herein since these embodiments are to be regarded as illustrative rather than restrictive.

I claim:

1. A collapsible trap for catching crustaceans, comprising in combination:
 a plurality of movably attached panels, said panels defining an enclosed cavity therein, with at least one of said panels including a first aperture for allowing the entry of said crustacean into said cavity;
 means within said cavity for containing bait therein;
 means within said cavity for restraining said crustaceans therein, said restraining means comprising a plurality of restraining partitions movably attached within said cavity for dividing said cavity into upper and lower chambers; and
 means for allowing said panels, said bait containing means and said restraining means to collapsibly fold into said cavity, thereby collapsing said crustacean trap.

2. An apparatus as described in claim 1 wherein said means for collapsibly folding said panels, said bait containing means and said restraining means into said cavity comprises a plurality of hinges.

3. An apparatus as described in claim 1 wherein said upper and lower chambers have an internal aperture therebetween, said internal aperture being defined by said plurality of said restraining partitions, with said internal aperture having further a circumferential ridge for restraining said crustaceans within said upper chamber.

4. An apparatus as described in claim 1 wherein said collapsible folding means allows said bait containing means to fold substantially flat against at least one of said panels.

5. An apparatus as described in claim 4 wherein said collapsible folding means attached to said restraining partitions allows said restraining partitions to fold substantially flat against at least one of said panels.

6. An apparatus as described in claim 5 wherein said collapsible folding means attached between said panels define a plurality of folding lines about which said panels fold into said cavity, thereby collapsing said crustacean trap.

7. An apparatus as described in claim 6 wherein one of said panels comprises a base panel having said bait containing means movably attached thereto.

8. An apparatus as described in claim 7 wherein said enclosed chamber comprises:
 a top panel displaced from said base panel;
 a plurality of end panels movably attached about a plurality of first folding lines to said base and top panels, with said end panels having a plurality of second folding lines interior thereto, whereby said crustacean trap collapses by having said second plurality of folding lines fold into said cavity and said first plurality of folding lines fold toward each other.

9. An apparatus as described in claim 8 wherein said folding lines are recessed from the marginal edge of one of two movably coupled panels, thereby providing an overlapping and abutting of said panels to add rigidity to said trap.

10. An apparatus as described in claim 9 wherein said enclosed chamber is defined further by a plurality of side panels movably attached to said base panel about a plurality of third folding lines, said panels communicating between said base and top panels.

11. An apparatus as described in claim 10 wherein said side panels are interposed between said end panels.

12. An apparatus as described in claim 11 wherein said third folding lines are vertically displaced from said first folding lines, whereby said end panels will fold generally upon said top panel.

13. An apparatus as described in claim 12 wherein said restraining partitions are movably attached to said side panels about a plurality of fourth folding lines, with said fourth folding lines allowing said restraining partitions to fold substantially flat against said side panels.

14. An apparatus as described in claim 13 wherein each of said restraining partitions comprise a plurality of restraining panels movably connected about a plurality of fifth folding lines.

15. An apparatus as described in claim 14 having means attached to said side panels for guiding said restraining panels into said enclosed cavity.

16. An apparatus as described in claim 15 wherein said guide means have means attached thereto for locking said restraining panels to said guide means, thereby forming said internal aperture separating said upper and lower chambers within said cavity.

17. An apparatus as described in claim 16 further having receiving means in the edge of said restraining panel defining said internal aperture for coupling with said locking means of said guiding means.

18. An apparatus as described in claim 17 having means attached to said side panels for coupling to said end panels, said coupling means engaging said overlapping and abutting panels adjacent to said second folding line of said end panels, thereby adding rigidity to said trap.

19. An apparatus as described in claim 18 having a tunnel for guiding said crustaceans through said first aperture of said one panel to said bait containing means, said tunnel comprising a plurality of tunnel panels movably coupled about a plurality of tunnel folding lines, with one of said tunnel panels attached about an aperture folding line to said one panel adjacent to said first aperture therethrough, with said tunnel panels collapsibly folding substantially flat onto said one side panel for storage.

* * * * *